June 23, 1959     E. F. HAUER     2,891,397
TRELLIS
Filed Dec. 5, 1955
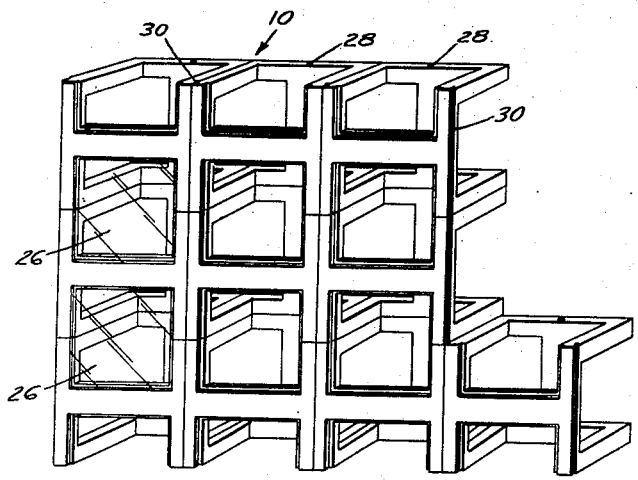
Fig. 1
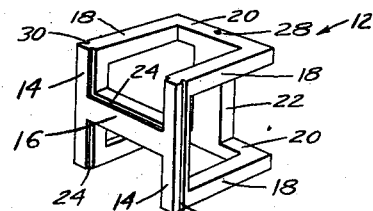
Fig. 2
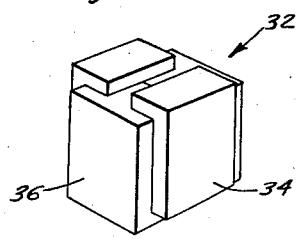
Fig. 3
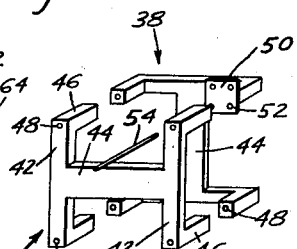
Fig. 6
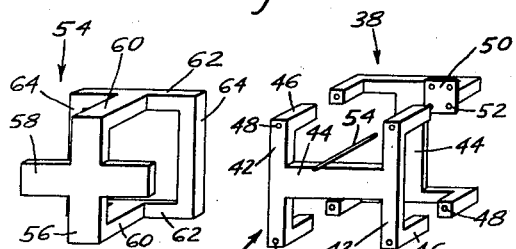
Fig. 5
Fig. 4
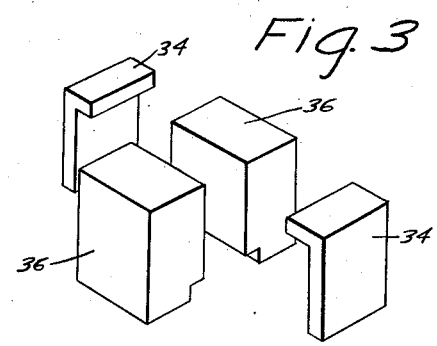
Fig. 8
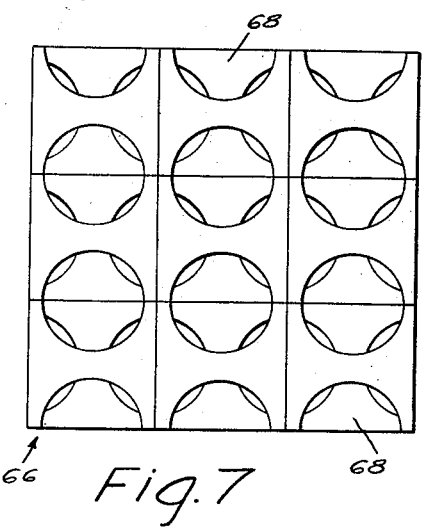
Fig. 7
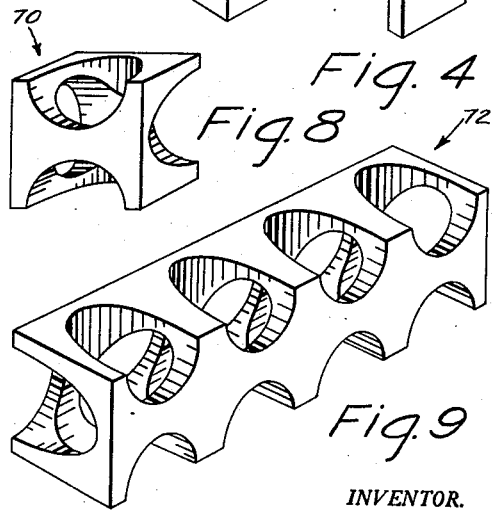
Fig. 9
INVENTOR.
Erwin Franz Hauer
BY Elliot A. Salter

United States Patent Office 2,891,397
Patented June 23, 1959

2,891,397

TRELLIS

Erwin Franz Hauer, Providence, R.I.

Application December 5, 1955, Serial No. 550,873

8 Claims. (Cl. 72—41)

The present invention pertains generally to a trellis or screen and has particular reference to novel means for the construction of the same.

A primary object of the instant invention is the provision of a trellis or screen which may be utilized vertically as a wall in a building or patio, and which may additionally be utilized horizontally as a ceiling.

Another principal object of the instant invention is the provision of a trellis or screen which will serve to diffuse the passage of light passing therethrough, thereby, in effect, providing a translucent wall or surface.

A further object is the provision of a trellis or screen so constructed as to provide a maximum of strength while utilizing a minimum of material.

Another object is the provision of a novel construction block which may be used in the fabrication of a trellis or screen of the character described.

Still another object of the instant invention is the provision of means for joining together a plurality of construction blocks to arrive at a completed trellis or screen.

A further object is the provision of a trellis or screen which is extremely attractive in appearance and which may easily be modified to provide a plurality of ornamental effects without affecting the functionality thereof.

A yet further object is the provision of a trellis or screen designed to carry temperature insulating means.

Another object is the provision of a novel construction block which may be used in the fabrication of a trellis or screen of the character described and the provision of means for constructing and manufacturing said block.

Still another object of the instant invention is the provision of a trellis or screen made up of a plurality of individual blocks joined together, whereby said trellis may be easily handled, stored and transported by reducing it to its broken-down state.

Other objects, features and advantages of the invention will become apparent as the description thereof proceeds when considered in connection with the accompanying illustrative drawings.

In the drawings which illustrate the best mode presently contemplated by me for carrying out my invention:

Fig. 1 is a perspective view of a portion of a trellis constructed in accordance with the instant invention;

Fig. 2 is a perspective view of a construction block which may be utilized in the fabrication of the trellis of Fig. 1;

Fig. 3 is a perspective view of a mold core which may be utilized in the manufacture of the block of Fig. 2;

Fig. 4 is a perspective view of the mold core of Fig. 3 with the portions thereof disassembled for purposes of illustration;

Fig. 5 is a perspective view of a two-section construction block which may be utilized in the fabrication of the trellis of Fig. 1;

Fig. 6 is a perspective view of a modified form of construction block;

Fig. 7 is a front elevation of a modified trellis;

Fig. 8 is a perspective view of a construction block which may be utilized in the fabrication of the trellis of Fig. 7; and Fig. 9 is a perspective view of a modified construction block which may be utilized in the fabrication of the trellis of Fig. 7.

Referring to the drawings, and more particularly to Fig. 1 thereof, there is shown a trellis generally designated at 10, constructed in accordance with the instant invention. The trellis 10 is actually constructed by assembling a plurality of construction blocks designated generally at 12 (Fig. 2) in horizontal and vertical alignment. The blocks 12 may be made of any suitable construction material, such as cement, ceramic, stucco, plastic, or metal, and are joined to each other to form the completed trellis 10 by any suitable means, such as cementing, riveting, or the like. Also, the trellis may be joined together by complementary notches and projections provided on adjacent blocks for interengagement. This method of joining the blocks together is of particular value where the trellis is to be used as a ceiling.

Referring now specifically to Fig. 2, it will be noted that construction block 12 comprises a pair of equilength legs 14 disposed in spaced parallel relation and having a bar 16 extending therebetween and substantially centrally disposed with respect to said legs 14. A plurality of supporting frame members 18 extend rearwardly from the ends of the legs 14 and have their free ends joined by upper and lower arms 20, which in turn are bridge by a centrally disposed bar 22, it being noted that the bars 16 and 22 extend in directions which are perpendicular to each other. Recesses 24 are provided along the upper and lower edge of bar 16 and also along the inner edges of legs 14 whereby to provide means for the reception of translucent insulating panes, such as glass or the like. For example, some of the glass panes are shown at 26 in Fig. 1. It will be understood that, if desired, glass panes could also be mounted in the same manner on the rear side of trellis 10 whereby to provide a dead-air space between the front and rear of the trellis thus improving the insulating characteristics thereof.

Also provided in construction block 12 is an elongated bore 28 which extends downwardly through the bar 22. while the outer surfaces of the legs 14 are each provided with elongated channels 30. When the blocks 12 are assembled to form the completed trellis, it will be understood that the channels 30 will align with the channels 30 of the adjacent blocks whereby to provide downwardly extending bores similar to bore 28 aforedescribed. Since these bores are located in and extend downwardly through each vertical frame of the completed trellis, they provide ready and convenient means for increasing the strength and rigidity of the structure by the insertion of elongated steel supporting rods (not shown) therein.

Although the construction block 12 may be made in any desirable way, molding has been found to be a particularly efficient and feasible method. Referring to Figs. 3 and 4, there is shown a mold core 32 which may be utilized in the manufacture of the block 12. It will be noted that core 32 comprises a pair of identical sections 34 and another pair of identical sections 34, which, when assembled and placed within a molding box, will result in the formation of the aforedescribed block 12. It will be understood, however, that molding is just one way of manufacturing said block, and other means, now to be described, could just as well be utilized.

Referring to Fig. 5, the block 12 is shown as comprising two sections 38 and 40. Section 40 comprises a pair of spaced parallel legs 42 having extending therebetween a cross bar 44. A plurality of square supporting frames 46 extend rearwardly from the ends of the legs 42 and are each provided therein with an elongated bore 48.

Section 38 is identical in construction to section 40, although it will be understood that when the two sections are joined to form the completed block, section 38 is rotated so that its cross bar 44 is perpendicularly disposed with respect to the direction of cross bar 44 of section 40. In accordance with the instant invention, means are provided for joining together sections 38 and 40, which means at the same time also function to maintain adjacent blocks in proper horizontal and vertical alignment whereby to maintain said blocks together to form a cohesive unit or trellis. Said means comprise a square plate portion 50, preferably of metal, having blanked therein four apertures 52. It will be understood that the dimensions of plate 50 are such that it will simultaneously receive four supporting frames 46 on each side thereof, the bores 48 in said supporting frames aligning with the openings 52. Elongated rods 54 are then inserted through the bores 48 and corresponding aperture 52 whereby said plate 50 acts as a binding means for holding together adjacent blocks. At the same time, the overall structure is strengthened since the rods 54 will function as supporting rods whereby to increase the rigidity and strength of the overall trellis. It is also within the scope of this form to provide a sheet of translucent insulating material (not shown) which would be disposed in the middle of the trellis and would extend in the plane thereof. For example, said translucent sheet could be mounted in between the sections 38 and 40, it being obvious that appropriate apertures would necessarily be provided to receive the rods 54. Such structure would conceivably be used in lieu of the glass panes as aforedescribed.

Another form of construction block is shown generally at 54 in Fig. 6, although it will be understood that a plurality of said blocks 54 mounted in vertical and horizontal alignment will result in the formation of an identical trellis as that shown in Fig. 1. Block 54 comprises a vertical bar 56 and a horizontal bar 58 extending thereacross. A pair of arms 60 extend rearwardly from the ends of the vertical bar 56, the arms 60 in turn merging with horizontal frames 62, which have vertical frames 64 spanning their free ends. Like the construction block 12 aforedescribed, block 54 may be molded or made in sections and fabricated.

Figs. 7 through 9 are directed to a modified trellis generally indicated at 66, said trellis differing from the aforedescribed trellis 10 only in that instead of rectangular openings therein, the openings take the form of circles or rounded openings 68. The trellis 66 may be constructed of a plurality of construction blocks such as is generally shown at 70 in Fig. 8. Here again, block 70 is identical to aforedescribed block 12, with the exception of the fact that the openings therein are round instead of square, and it will be understood that said blocks 70 may be molded as a whole, or in sections and then fabricated in an identical manner to that described in connection with the block 12. Instead of using individual blocks such as 70 to provide the completed trellis 66, an elongated block 72 (Fig. 9) may be utilized. The block 72, preferably molded, is nothing more than an aggregation of a plurality of the individual blocks 70 and hence no further description thereof is deemed necessary. With respect to this, however, it will be understood that an elongated block (not shown) comprising an aggregation of the square blocks 12 could also be provided, if desired, in formulating the trellis 10.

Thus it will be seen that there has been provided in accordance with this invention a trellis which, in effect, comprises a front lattice portion having a plurality of horizontally and vertically aligned openings and a rear lattice portion, also having a plurality of horizontally and vertically aligned openings. The openings of said front and rear lattices are staggered with respect to each other, as will be seen most clearly from Fig. 7 whereby to provide a labyrinth-like arrangement for the transmission of light passing therethrough. An important feature of the instant invention is the formulation of a trellis of the character described by means of utilizing a plurality of individual construction blocks, which, when assembled, cooperate to produce the completed trellis. Due to the peculiar construction of the blocks, and accordingly, the resulting construction of the completed trellis, there is provided a surface of unusually high strength although a very minimum of material has been employed. The appearance of the completed trellis is extremely attractive, particularly where the form of Figs. 7 through 9 is utilized and therefore is quite adaptable for use as a translucent wall in virtually any type of building structure or patio. A trellis constructed in accordance with the instant invention may also find an application as a ceiling wherever a translucent overhead surface is necessary or desirable. Whether said trellis is being used as a wall or a ceiling, however, it lends itself to a plurality of ornamental and functional modifications thereby greatly increasing the versatility of the structure. For example, artificial lighting could be set up within the body of the trellis whereby the benefits of natural light may be obtained during the day time, while artificial light could be caused to emanate therefrom at night. Whether the light passing therethrough be artificial or natural, however, a very effective and complete diffusion thereof is obtained, and this factor constitutes one of the more practical and important advantages of the instant invention.

While there is shown and described herein certain specific structure embodying the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

I claim:

1. A trellis of the character described comprising a uni-planar first surface and a uni-planar second surface in spaced parallel relation thereto, each of said surfaces comprising a plurality of first frame members extending in spaced parallel relation and a plurality of parallel second frame members perpendicularly disposed to said first frame members and extending thereacross whereby to form a pair of lattices each having a plurality of horizontally and vertically aligned openings, said respective first frame members and said respective second frame members being staggered with respect to each other so that each of the openings in one lattice is disposed in alignment with one of the points of intersection in the other lattice to diffuse light passing through the trellis, and a plurality of additional frame members extending from the first frame members of the first surface to the second frame members of the second surface to maintain said surfaces in their spaced parallel relation.

2. A trellis of the character described having a first lattice, a second lattice substantially coextensive therewith and in spaced parallel relation with respect thereto, said lattices each comprising a plurality of vertically extending frame members and a plurality of horizontal frame members perpendicularly extending thereacross to provide a plurality of horizontally and vertically aligned openings, the vertical and horizontal frame members of said first lattice being offset with respect to the vertical and horizontal frame members, respectively, of said second lattice to stagger the openings in said lattices so that each of the openings in one lattice is disposed in alignment with one of the points of intersection in the other lattice to diffuse light passing through the trellis, a plurality of rearwardly extending supporting frame bars carried by the vertical frame members of said first lattice, one of said supporting frame bars being located on said vertical frame members intermediate each pair of horizontal frame members, said supporting frame bars joining with the horizontal frame members of said second lattice whereby to maintain said lattices in spaced parallel relation.

3. A construction block for use in the fabrication of a trellis of the character described, said block consisting of a pair of equi-length legs disposed in spaced parallel relation, a bar bridging said legs intermediate the lengths thereof, said legs otherwise being disconnected, a plurality of equi-length supporting frame members extending rearwardly from the ends of said legs, a pair of spaced parallel arms bridging the free ends of said supporting frame members, said arms extending parallel to said aforementioned bridging bar, and a second bar extending across said arms intermediate the lengths thereof, said arms otherwise being disconnected.

4. A construction block for use in the fabrication of a trellis of the character described, said block consisting of a pair of equi-length legs disposed in spaced parallel relation, a bar bridging said legs intermediate the lengths thereof, said legs otherwise being disconnected, and a plurality of supporting frame members extending rearwardly from the ends of said legs and terminating in spaced, disconnected relation to each other.

5. A construction block for use in the fabrication of a trellis of the character described, said block consisting of a vertical bar having a horizontal bar extending thereacross to form an open, unframed cross member, a pair of arms extending rearwardly from the ends of said vertical bar, each of said arms carrying at its free end a horizontal frame member of the same length as and in parallel disposition to said horizontal bar, and vertical frame members spanning the free ends of said horizontal frame members.

6. A trellis as set forth in claim 1 further characterized in that said additional frame members comprise integral extensions.

7. A trellis of the character described comprising a first lattice consisting of a plurality of spaced parallel first frame members and a plurality of spaced parallel second frame members perpendicularly intersecting and extending across said first members to define a plurality of horizontally and vertically aligned openings, a similar second lattice substantially coextensive with said first lattice and in spaced parallel relation with respect thereto, the openings of said first lattice being horizontally and vertically staggered with respect to the openings of said second lattice so that each of the openings in one lattice is disposed in alignment with one of the points of intersection in the other lattice to diffuse light passing through the trellis, and means extending between said lattices for maintaining them in spaced parallel relation.

8. A trellis as set forth in claim 7 further characterized in that said last mentioned means is an integral part of said lattices.

References Cited in the file of this patent

UNITED STATES PATENTS

| | | |
|---|---|---|
| 924,153 | Elliott | June 8, 1909 |
| 1,412,504 | Bryne | Apr. 11, 1922 |
| 2,115,264 | Henderson | Apr. 26, 1938 |
| 2,546,494 | Buchholz | Mar. 27, 1951 |
| 2,709,975 | Parker | June 7, 1955 |
| 2,741,874 | Denning | Apr. 17, 1956 |

FOREIGN PATENTS

| | | |
|---|---|---|
| 15,641 | Great Britain | of 1910 |
| 933,711 | France | Jan. 5, 1948 |